United States Patent [19]
Dibelius et al.

[11] 3,777,484
[45] Dec. 11, 1973

[54] SHROUDED COMBUSTION LINER

[75] Inventors: Norman R. Dibelius, Ballston Spa; Richard B. Schiefer, Schenectady, both of N.Y.

[73] Assignee: General Electric Company, Schenectady, N.Y.

[22] Filed: Dec. 8, 1971

[21] Appl. No.: 206,021

[52] U.S. Cl. ............................ 60/39.65, 60/39.66
[51] Int. Cl. ............................................... F02c 1/00
[58] Field of Search ...................... 60/39.65, 39.66

[56] References Cited
UNITED STATES PATENTS
| | | | |
|---|---|---|---|
| 3,016,703 | 1/1962 | Lorett | 60/39.65 |
| 3,570,241 | 3/1971 | Alexander | 60/39.65 UX |
| 3,169,367 | 5/1965 | Hussey | 60/39.65 UX |
| 3,369,363 | 8/1968 | Campbell | 60/39.65 UX |

FOREIGN PATENTS OR APPLICATIONS
| | | | |
|---|---|---|---|
| 537,213 | 2/1957 | Canada | 60/39.65 |

*Primary Examiner*—Clarence R. Gordon
*Attorney*—Frank L. Neuhauser et al.

[57] ABSTRACT

A gas turbine combustion chamber having an outer casing and a concentrically mounted inner liner. The inner liner is formed with annular rows of spaced louvers for admitting cooling air and annular rows of spaced primary air holes. A shroud is circumscribed about the inner liner and spaced there from. Annular rows of spaced cooling air holes are formed in the shroud and direct jets of cooling air to hot spots or hot highly stressed areas between the louvers. The presence of the shroud makes it possible to increase the opening of the louvers for increasing the thickness of a cooling air film. The shroud also is formed with primary air holes which are slightly larger than and in approximate register with the primary air holes in the inner liner.

3 Claims, 5 Drawing Figures

SHROUDED COMBUSTION LINER

BACKGROUND OF THE INVENTION

This invention relates, in general, to a combustion chamber for a gas turbine, and in particular, this invention pertains to a shroud cover for a combustion chamber liner.

In a gas turbine, one of the more vulnerable parts, in terms of early replacement required, is the combustion liner of the combustion chamber. The combustion liner is subjected to extreme heating conditions and temperature stresses due to its proximity to the luminous flame and hot gases supporting the combustion process. Therefore, it is important to maximize the effect of cooling air adjacent the combustion liner in order to prolong the useful life of the combustion liner.

Air delivered to the combustion chamber has two functions. One function, already mentioned, is to provide some cooling of the liner while the other function is to provide the precise amount of primary air necessary to support optimum combustion conditions. Too little primary air may result in incomplete combustion and smoking; and, too much air may result in flame instability or a tendency to blow out.

SUMMARY

The combustion chamber of a gas turbine includes an outer casing and a concentrically mounted inner liner having a number of annular rows of spaced louvers. The inner liner is also provided with a number of annular rows of spaced primary air holes. A shroud is circumscribed about and spaced from the inner liner and supported thereon; and the shroud is formed with a plurality of annular rows of spaced cooling holes. The shroud cooling holes are accurately positioned to provide jet impingement cooling air to the hot, highly stressed, areas or hot spots between the louvers for the purpose of relieving the temperature gradient and reducing thermal stresses. The presence of the shroud reduces the pressure drop across the louvers with a corresponding reduction in the velocity of the air through the louvers. This makes it possible to increase the opening of the louver which results in an increase in the thickness of the cooling air film and improves the cooling. There are also annular rows of spaced primary air holes in the shroud slightly larger than and in approximate register with the primary air holes in the inner liner. The size of the primary air holes in the shroud must be 1.25 to 1.70 times larger in area than the air holes in the louvered liner in order not to upset the air flow pattern through the primary air holes in the liner.

It is therefore one object of the present invention to provide an improved combustion chamber which will increase the effectiveness of the cooling air flow adjacent the wall of the combustion liner.

Another object of the present invention is to provide an improved combustion chamber which will support optimum combustion conditions while maximizing the effectiveness of the cooling air flow.

Other objects and advantages will become apparent from the following description of one embodiment of the invention, and the novel features will be particularly pointed out hereinafter in the claims.

DESCRIPTION OF THE PREFERRED EMBODIMENT

Figure 1:
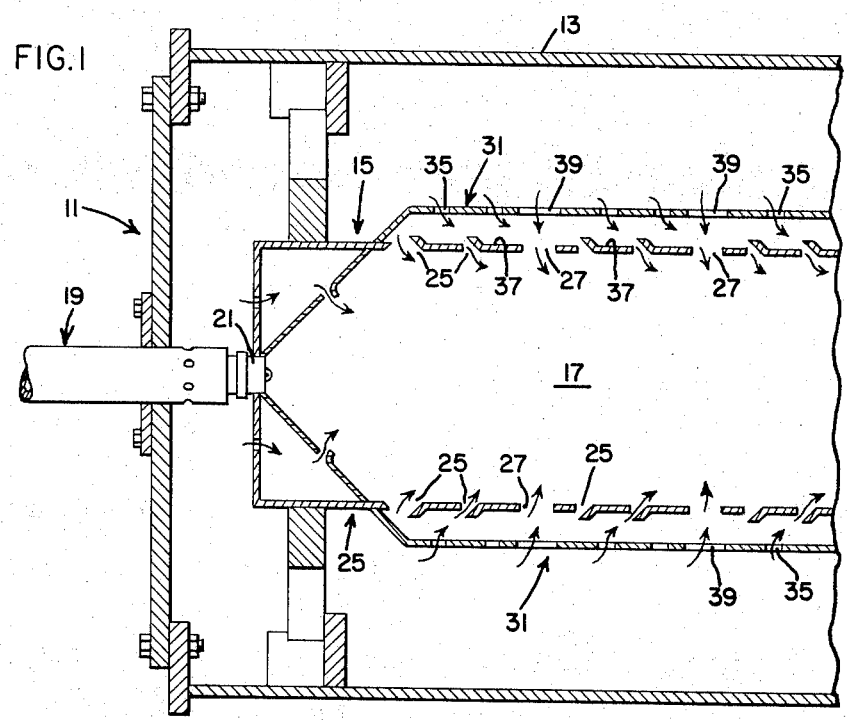
FIG. 1 is a partially cut away, elevation side view of a part of a gas turbine combustion chamber in which the present invention is employed with arrows indicating the approximate flow of air.
Figure 2:
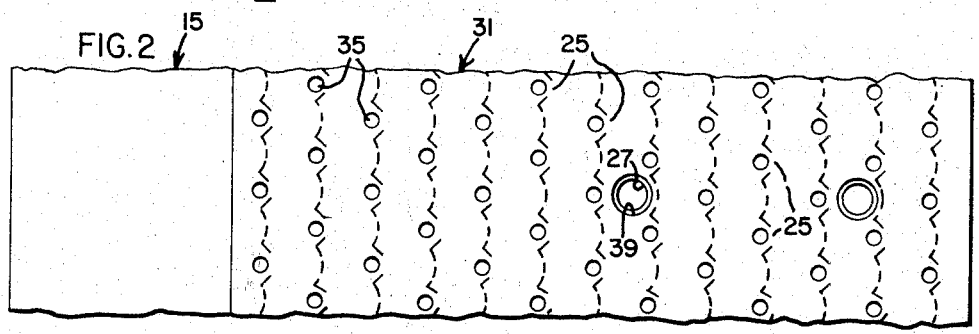
FIG. 2 is a top view of a section of the inner liner and a shroud applied thereto according to the present invention.
Figure 4:
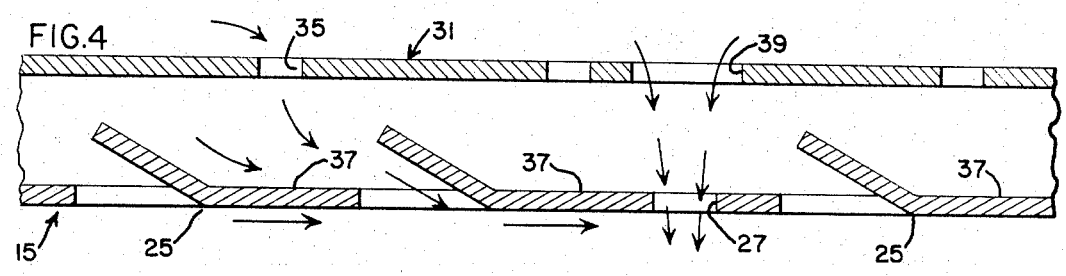
FIG. 4 is an enlarged side view section of the liner and shroud according to the present invention with arrows indicating the approximate flow of air.

A portion of a gas turbine combustion chamber 11 is shown in FIGS. 1 and 2, and 4 including an outer casing 13 and a concentric inner liner 15, the latter defining a combustion zone 17. A fuel supply pipe 19 enters the forward end of the outer casing and communicates with a fuel nozzle 21 at the forward end of the combustion zone.

The inner liner of the combustion chamber includes a number of annular rows of spaced louvers 25 which direct the flow of cooling air so that it forms a film of cooling air immediately adjacent the interior wall of the inner liner in a manner which will be later described.

A number of annular rows of spaced primary or combustion air holes 27 are provided in the inner lining for delivering air to the combustion zone.

A shroud 31 is concentrically mounted around the inner lining and spaced therefrom and includes a plurality of annular rows of spaced cooling holes 35 which provide cooling air into the space between the shroud and the liner and from there to be directed by the louvers into the combustion chamber. The holes 35 are also arranged so that cooling air is directed in jets toward "hot spots" 37 immediately preceeding and in between louvers 25.

There are also provided, in the shroud, a number of annular rows of spaced primary or combustion air holes 39 which are substantially in register with the primary air holes 27 in the inner liner but are larger as shown in FIG. 4. The primary holes in the shroud are about 1.25 to 1.70 times larger in area than the primary air holes in the liner, dependent upon the annular spacing between the shroud and the liner.

OPERATION

Figure 3:
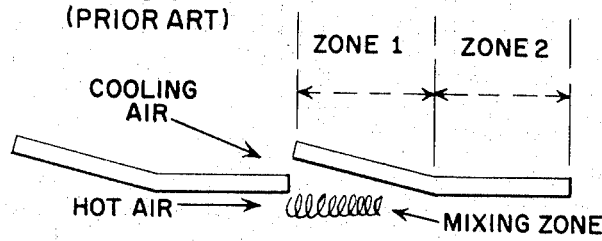
FIG. 3 is a diagramatic representation of the cooling air flow through a louver in the combustion chamber inner liner as found in the prior art.

In FIG. 3, there is shown an enlarged view of an unshrouded louver with a supply of cooling air as disclosed in the prior art. Heat from a luminous flame (not shown) is transferred to the liner wall predominently by radiation from the combustion flame and the liner wall is cooled primarily by forced convection to the cooling air which flows through the louvers and forms a cooling film on the inside surface of the liner.

As shown in FIG. 3, zone 1, cooling air is heated by mixing with the hot air film from upstream of the louver opening and by convection from the hot liner wall. Also the difference in temperature between the cooling air and metal is great in zone 1. Note that the mixing zone in this prior art representation exhibits a high degree of mixing due to the high velocity of the cooling air through the unshrouded louver shearing the hot air stream. As shown by the broken line in FIG. 5, zone 1 the rate of temperature rise is rapid as contrasted with the rate of temperature rise in zone 2. In zone 2 the temperature of the cooling air is closer to that of the liner metal and heating becomes a function of the liner metal primarily and so the rate of temperature rise is diminished.

Figure 5:
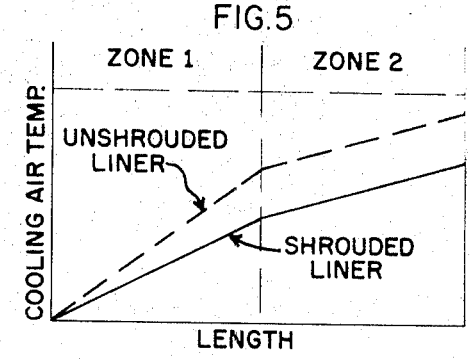
FIG. 5 is a graph illustrating the rate of temperature rise as the cooling air passes through the louvers in both a shrouded and unshrouded liner.

In order to improve the effectiveness of the cooling air without increasing the quantity of cooling air, the effect of mixing the cooling air with the hot film must be reduced. This can be done in two ways. The first is to reduce the difference in velocity between the cooling air and the hot air film, thus reducing the shear which results in the reduction of the mixing of the two gas streams and, secondly, by increasing the height of the louver as shown in FIG. 4 to make the cooling air film thicker. In order to accomplish this without increasing the quantity of cooling air, the pressure drop across the louvers must be reduced without reducing the pressure drop across the primary or combustion air holes. This can be done by surrounding the louvered liner with the perforated outer shroud as heretofore described. In addition, the perforations or cooling air holes can be located above the hot stressed areas 37 between louvers thus taking advantage of jet cooling of the hottest area. The effect of placing a shroud on the combination liner is shown in FIG. 5, solid line, where the temperature rise in the shrouded liner is less than that of the unshrouded liner in zone 1, as well as the end temperature conditions in zone 2.

If the combustion air holes in the shroud are too much smaller than those in the liner the combustion air jet will entrain air from the space between the shroud and the liner and if they are too much larger air will spill into the space between the shroud and liner, but if the ratio of the combustion air hole areas is in the approximate range from 1.25 to 1 to 1.70 to 1 shroud to liner, the jet will neither spill over or entrain extra air and a tube connecting inner liner and outer shroud around the combustion air holes is not necessary.

Thus the invention will improve liner cooling with a reduction of liner temperature and hot spots which would increase the strength of the material in the area where the low cycle thermal stress fatigue cracks occur and therefore the liner life should be increased many times over that for an unshrouded liner.

While there is shown what is considered to be the preferred embodiment of the invention, it is of course understood that various other modifications may be made therein and it is intended to cover in the appended claims all such modifications as fall within the true spirit and scope of the invention.

What is claimed is:

1. In a gas turbine combustion chamber of the type including an outer casing having a fuel nozzle disposed therein communicating with an inner liner concentrically mounted within the outer casing, said inner liner being formed with annular rows of spaced louver openings and annular rows of spaced primary air holes along the length thereof, and further including:
   a shroud surrounding the liner and spaced therefrom including a plurality of annular rows of spaced cooling air holes along the length of the shroud to overlie the areas between the annular rows of spaced louver openings;
   the shroud further including a plurality of annular rows of spaced primary air holes substantially in register with and larger than the primary air holes in the liner.

2. The combustion chamber recited in claim 1 wherein the cooling air holes are disposed to overlay hot spots on the inner liner between the louver openings.

3. The combustion chamber as recited in claim 1 wherein the primary air holes in the shroud are in the range 1.25 to 1.7 times larger in area than the primary air holes in the liner, the exact value dependent upon the spacing between the shroud and the liner.

* * * * *